(12) United States Patent
Schmid

(10) Patent No.: US 10,064,509 B2
(45) Date of Patent: Sep. 4, 2018

(54) SPOON WITH RETENTION MEANS

(71) Applicant: Martin Schmid, Munich (DE)

(72) Inventor: Martin Schmid, Munich (DE)

( * ) Notice: Subject to any disclaimer, the term of this patent is extended or adjusted under 35 U.S.C. 154(b) by 0 days.

(21) Appl. No.: 15/135,698

(22) Filed: Apr. 22, 2016

(65) Prior Publication Data

US 2016/0324347 A1    Nov. 10, 2016

(30) Foreign Application Priority Data

Apr. 24, 2015   (DE) .................... 20 2015 102 062 U

(51) Int. Cl.
*A47G 21/04*   (2006.01)
*A47J 43/28*   (2006.01)

(52) U.S. Cl.
CPC .............. *A47G 21/04* (2013.01); *A47J 43/28* (2013.01)

(58) Field of Classification Search
CPC .. A47G 21/04; A47G 2021/002; A61J 7/0023
USPC .................................................. 30/326, 324
See application file for complete search history.

(56) References Cited

U.S. PATENT DOCUMENTS

| 280,985 A * | 7/1883 | Williams .............. A61J 7/0023 |
| | | 30/326 |
| 620,792 A | 3/1899 | Middleton |
| 1,633,605 A * | 6/1927 | Prudden ............... B65D 51/246 |
| | | 229/125.03 |
| 2,640,263 A * | 6/1953 | Dieterich ............... A47G 21/04 |
| | | 30/326 |
| 2,803,059 A * | 8/1957 | Murdock ............... A47G 21/04 |
| | | 30/324 |
| 3,911,578 A | 10/1975 | Ushkow et al. |
| 6,701,625 B1 | 3/2004 | Thomason et al. |
| 8,291,600 B1 * | 10/2012 | Huchthausen ........ A47J 43/281 |
| | | 30/324 |
| 2007/0084064 A1 | 4/2007 | Fite et al. |
| 2013/0125402 A1 * | 5/2013 | Chubenko .............. A47G 21/00 |
| | | 30/150 |
| 2014/0190022 A1 * | 7/2014 | Siren ..................... A47J 43/281 |
| | | 30/324 |

FOREIGN PATENT DOCUMENTS

| DE | 9107607 U1 | 10/1992 |
| DE | 20009883 U1 | 8/2000 |
| DE | 10000546 A1 | 1/2002 |
| DE | 20119298 U1 | 5/2002 |
| GB | 2371469 A | 7/2002 |

OTHER PUBLICATIONS

Machine translation of DE 10000546 A to Aogastin.

(Continued)

*Primary Examiner* — Laura M Lee
(74) *Attorney, Agent, or Firm* — The H.T. Than Law Group

(57) ABSTRACT

The present invention comprises a spoon (1) with a handle (2) and a rigid central base region (3), wherein the rigid central base region (3) merges at its periphery into an extended portion, which, in the resting condition forms a retaining edge (5) inclined inwards relative to a vertical axis (4), and wherein the retaining edge (5) is embodied to be foldable inwards relative to the base region (3).

7 Claims, 4 Drawing Sheets

(56) References Cited

OTHER PUBLICATIONS

Machine translation of DE 20009883 U1 to Schmeiler.
Machine translation of DE 20119298 U1 to Lethen.
Machine translation of DE 9107607 U1 to Hoffmann.
German Search Report issued in connection with the corresponding German Patent Application No. 20 2015 102 062.7 dated Aug. 10, 2015.

* cited by examiner

Section A-A

SPOON WITH RETENTION MEANS

FIELD OF THE INVENTION

The present invention relates to a spoon, especially a spoon comprising a rigid central base region which merges at its periphery into an extended portion, which forms an inwardly directed, foldable retaining edge. By preference, the retaining edge is flexible.

The spoon according to the invention is particularly suitable for feeding babies, young children, elderly persons, patients and so on.

BACKGROUND TO THE INVENTION

Spoons for the consumption of foods are known in the prior art.

DE 100 00 546 A1 discloses a spoon which is integrated in the lid of a food container made from cardboard, plastic or aluminum.

DE 200 09 883 U1 discloses a spoon with a continuously hollow stem as a line for foods to be consumed.

DE 201 01 563 U1 discloses a spoon with a closable bottom opening and a cavity which forms a receiving space open at the top, in order to facilitate the filling of liquid or particles into a desired container.

The conventional spoons for the consumption of foods generally provide an open cup, the spoon bowl or respectively the central base region, in which the food is transported to the mouth. The central base region is connected to the handle of the spoon which is used for holding the spoon. In order to guide the food safely into the mouth, it is necessary to hold the spoon, especially, the bowl, horizontally, because otherwise the food flows over its edges or drops out.

In order to hold the spoon horizontally during the movement from the source of the food to the mouth, a complex movement process with interplay of shoulder joint, elbow, wrist and fingers is necessary.

For certain users, such as babies, young children, elderly persons, patients or otherwise limited persons, the performance of this movement process may be problematic or impossible for different reasons. This means that the spoon is not guided horizontally to the mouth and the food accordingly partially or completely flows over the edge of the spoon or respectively drops out.

OBJECT OF THE INVENTION

Starting from this prior art, the object of the present invention is to provide a spoon for the consumption of foods which prevents or reduces the dropping out or the spillage of the preferably flowable or pourable food.

FURTHER PRIOR ART

Furthermore, the following documents are known:
DE 91 07 607 U1;
U.S. Pat. No. 6,701,625 B1;
US 2007/0084064 A1;
U.S. Pat. No. 620,792 A;
U.S. Pat. No. 3,911,578 A; and
U.S. Pat. No. 2,803,059 A.

SUMMARY OF THE INVENTION

The object of the present invention is achieved by the features of the independent claims.

The dependent claims develop the idea of the invention further in an advantageous manner.

A spoon according to the invention with a handle, comprises a rigid central base region, which merges at its periphery into an extended portion, which, in the resting condition, forms a retaining edge inclined inwards relative to the vertical axis (at an acute angle relative to the vertical), wherein the retaining edge is embodied to be foldable inwards relative to the base region.

The inward inclination in the unloaded resting condition can be, for example, 3' to 30°, preferably 5° to 25°, by further preference 10° to 20° relative to the vertical.

By preference, in the unloaded resting condition, the retaining edge and at least one part or respectively sub-region of the base region of the spoon overlap each other, wherein, by preference, a hollow space or respectively cavity is formed in the region of the overlapping of the base region with the retaining edge.

By preference, in the unloaded resting condition, the spoon comprises a hollow space or respectively cavity, which is formed between the base region of the spoon and the retaining edge of the spoon.

In this context, the retaining edge can be foldable so far inwards that it rests with its full surface on the upper side of the base region.

In other words, the retaining edge is preferably embodied to be foldable inwards relative to the base region in such a manner that, in a folded condition, the retaining edge is disposed in full-surface contact with the rigid central base region.

The retaining edge can therefore be foldable inwards relative to the base region in such a manner that, in a folded condition, at least one part of the rigid central base region is covered/concealed by the retaining edge. Furthermore, the retaining edge can be foldable inwards in such a manner that the hollow cavity preferably formed in the unloaded resting condition between the base region and the retaining region is closed.

Consequently, the retaining edge is preferably embodied to be foldable inwards in such a manner that, in the folded condition, a part of the rigid central base region is covered/concealed by the retaining edge and/or the cavity formed preferably in the unloaded resting condition between the base region and the retaining edge is closed.

The "folded condition" is understood to mean the condition, when, because of the external force (for example, through a user's lips or mouth or through the food to be consumed) which acts on the spoon and consequently on the retaining edge, especially on the upper side of the spoon or respectively of the retaining edge, the retaining edge or respectively a part of the retaining edge has left the position specified in the unloaded resting condition and is folded inwards relative to the base region of the spoon.

By preference, the retaining edge is embodied in such a manner that only a part of the retaining edge on which an external force is exerted is folded inwards relative to the base region, while the other park of the retaining edge, on which no external force is exerted, remains in the position of the resting condition.

By preference, the retaining edge returns automatically to the resting condition or respectively to the position of the resting condition after a caused (by an external force, for example, a user's lips or mouth) folding inwards.

The retaining edge is embodied in such a manner that, from the inwardly inclined position in the resting condition, it cannot be tilted further outwards, that is, in the direction towards or beyond the vertical.

The retaining edge can be curved, accordingly, in this case, the plane formed by the retaining edge is inclined inwards.

However, the retaining edge can also be embodied at least partially in a rectilinear manner, that is, without curvature in the sectional view.

The transition from the base region to the retaining edge can take place with a constant curvature or through a kink (in cross-sectional view).

The retaining edge can be foldable inwards relative to the base region because of a flexible material embodiment and/or through a hinge action at hinge 10 shown in FIGS. 4 and 5 in the transition from the base region to the retaining edge.

By preference, base region and retaining edge are formed in one piece from the same material, preferably synthetic material.

By preference, the wall thickness of the retaining edge tapers towards its outer edge.

Through its shape, the extended portion, especially the inwardly inclined retaining edge of the spoon according to the invention. Advantageously favours the flow or respectively the slipping of food from the outer edge of the rigid central base region in the direction towards the middle, while it prevents the escape or respectively the slipping out from the rigid central base region over the edges of the rigid central base region.

The portion extending the rigid central base region which forms a retaining edge partially overhangs the open area of the rigid central base region. Accordingly, the food can be taken up from a plate without difficulty.

If the spoon according to the invention is moved out of the horizontal on the way from the food source, for example, a plate or a bowl, towards the consumer's mouth, the retaining edge, as a form-closure, prevents the dropping out or respectively spillage of the food.

By preference, a spoon according to the invention provides a retaining edge which is arranged at an angle α from 0-90°, preferably at an angle α from 10-80°, by further preference at an angle α from 20-70°, by greater preference, with an angle α 30-60° relative to the vertical axis in the resting condition.

By further preference, the retaining edge of the spoon according to the invention is flexible.

In the user's mouth, the food is generally removed or respectively drawn from the central base region of the spoon by the upper lip.

A further advantage of the invention lies in the flexibility and dimensioning of the retaining edge of the spoon according to the invention, because of which, yielding to the pressure of the user's lips, the retaining edge folds inwards in the direction of the rigid central base region and comes in contact with it. The food can therefore easily be removed from the spoon according to the invention.

According to one preferred embodiment of the invention, the retaining edge of the spoon according to the invention comprises elastic material.

In a further preferred embodiment, the elastic material of the retaining edge is see ted from the group of the synthetic materials, by further preference from the group of silicones.

In another preferred embodiment, the retaining edge of the spoon according to the invention comprises the same material as the rigid central base region.

By further preference, the transition from the rigid cent base region to the retaining edge of the spoon according to the invention is continuous.

The rigid central base region and the retaining edge according to the invention advantageously comprise a synthetic material.

By preference, the synthetic material becomes steadily thinner towards the top, so that the material in the central base region is rigid, whereas the retaining edge is embodied to be flexible.

Optionally, the retaining edge of the spoon according to the invention can comprise a different material from the rigid central base region.

For example, the rigid central base region can comprise a metal, while the retaining edge comprises a synthetic material.

By preference, the retaining edge (5) is rigid and foldable inwards relative to the rigid central base region (3) through hinges (10).

Especially in the case of hard and/or heavy foods, a rigid retaining edge brings advantages, because the latter withstands a stronger loading through large quantities of food.

With the spoon according to the invention for the consumption of food, an independent consumption of food is advantageously made possible for users who are incapable or capable only to a limited extent of handling a conventional spoon, wherein the quantity of food per spoon delivery is increased by comparison with conventional spoons.

For example, in the case of babies and young children who are just learning to eat independently with a spoon, this leads to early experiences of success and consequently to a positive learning experience. This is coupled with an accelerated learning process.

Furthermore, with the spoon according to the invention for the consumption of food, contamination of the environment, of the user and their clothing through food spilling or dropping from the spoon is reduced. Accordingly, the effort for cleaning and care is significantly reduced.

Similarly, with the spoon according to the invention, a user's frustration through failures or mistakes in the consumption of food with cutlery, especially with the spoon, is avoided.

Furthermore, with the spoon according to the invention for the consumption of food, unnecessary reductions in nutrition in the form of food dropped and accordingly wasted are significantly reduced.

Furthermore, the spoon according to the invention is advantageous, because no additional components, for example, a lid or a cap to enclose the preferably flowable or pourable food disposed on the spoon is required in order to prevent a dropping or respectively spilling of the food from the spoon, especially a lateral dropping or respectively spilling of the food over the lateral edge of the spoon during use by a user. The use of such an additional component would, in fact, be effort intensive, because every time food is received onto the spoon, the additional component would have to be changed (for example, a lid would have to be removed from the spoon in order to place food onto the spoon). Furthermore, additional components can easily be lost.

The spoon according to the invention can be used not only for foods but also for other substances. For example, the spoon can also be used for the consumption of preferably liquid or pourable medicine.

DRAWINGS

In the following, the present invention will be described in greater detail on the basis of the accompanying drawings, which show a preferred exemplary embodiment of the invention.

FIG. 4 shows the spoon according to the invention in the resting condition.

FIG. 5 shows the food consumption with the spoon according to the invention.

FIG. 6 shows the manner of functioning of the retaining edge during the movement of the spoon with food.

FIG. 7 shows the removal of the food with the mouth or respectively the upper lip.

EXEMPLARY EMBODIMENT

Figure 1:
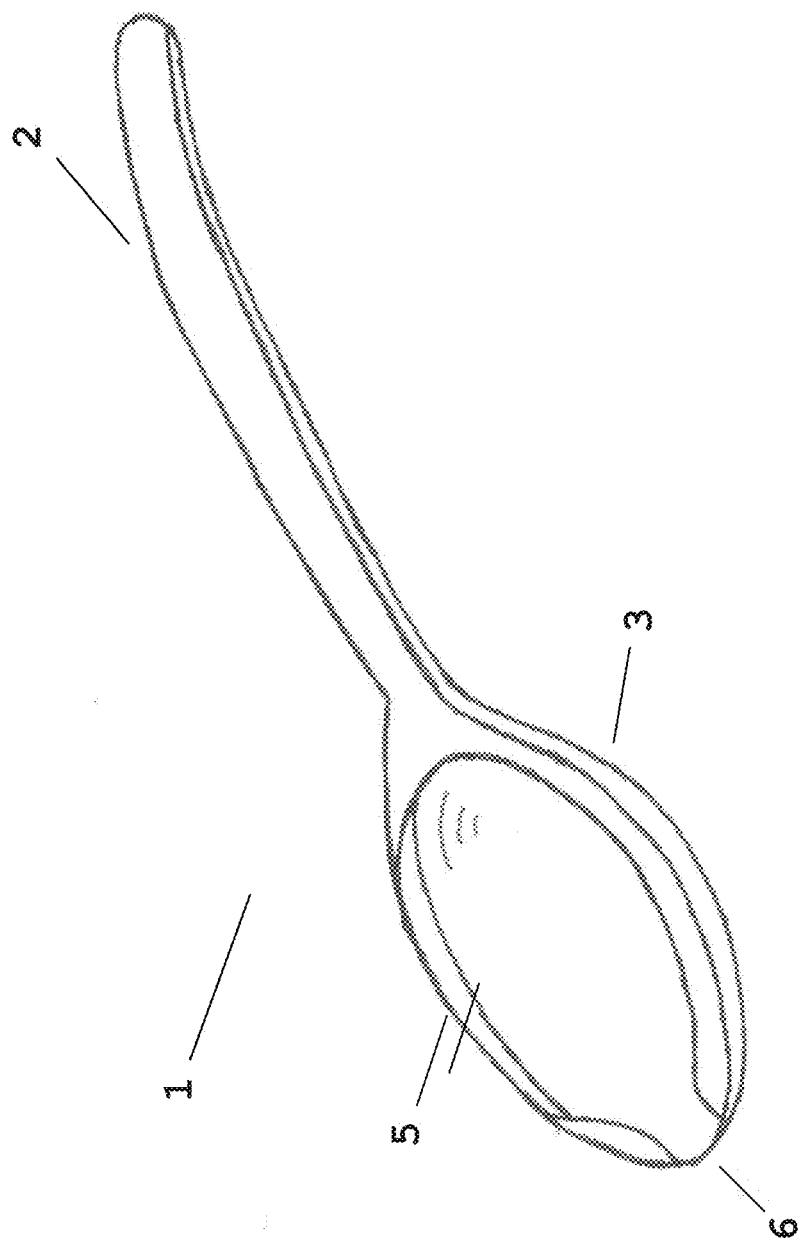
FIG. 1 shows schematically a spoon according to the invention with extended portion, which forms a retaining edge.
Figure 4:
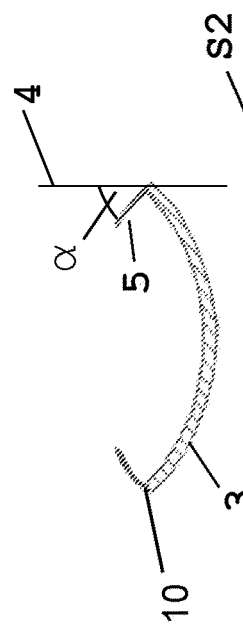
FIGS. 4-7 show cross sections from FIG. 2 from A-A and visualise the manner of action of a spoon according to the invention with extended portion which forms an inwardly foldable retaining edge.

FIG. 1 shows an overall view of a spoon 1 with a handle 2 and a rigid central base region 3, which merges at its periphery into an extended portion, which, in the resting condition, forms a retaining edge 5 inclined inwards relative to the vertical axis 4 (see FIG. 4). For improved removal of the food from the rigid central base region 3, the retaining edge 5 is provided with an opening 6 at the tip of the rigid central base region 3. The retaining edge is foldable in the direction towards the rigid central base region.

As shown in FIG. 1, the retaining edge 5 preferably partially overlaps the base region 3 in such a manner that a removal of food on the spoon 1, especially on the base region 3 of the spoon 1, can take place from above. Through this partial overlapping of the base region 3 with the retaining edge 5, a hollow space or respectively cavity is preferably formed between the retaining edge 5 and a part or respectively sub-region of the base region 3.

Figure 2:
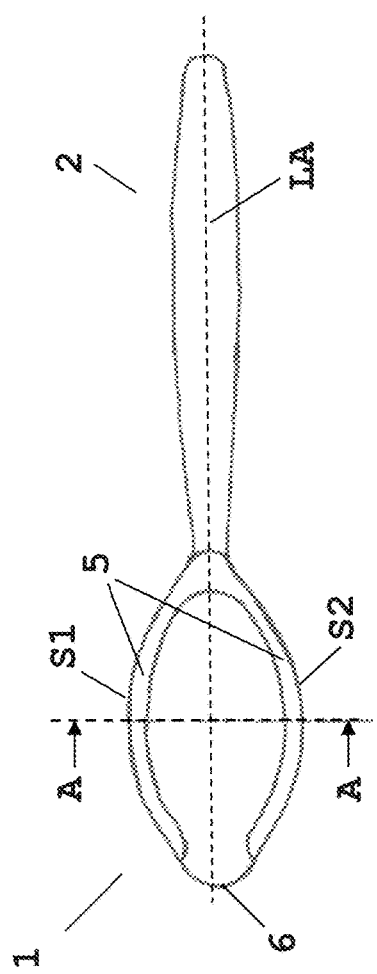
FIG. 2 shows a schematic plan view of a spoon according to the invention from FIG. 1.

FIG. 2 shows a schematic plan view of a spoon 1 with a handle 2 and a rigid central base region 3, which merges at its periphery into an extended portion, which, in the resting condition, forms and retaining edge 5 inclined inwards relative to the vertical axis 4 (see FIG. 4). The retaining edge 5 is provided with an opening 6 at the tip of the rigid central base area 3 and is foldable relative to the rigid central base region.

FIG. 2 shows the longitudinal axis LA of the spoon, that is, the axis formed in longitudinal extension of the spoon 1, which subdivides the spoon 1 into two sides S1 and S2, and the base region 3 and the retaining edge 5 into two parts. By preference, the longitudinal axis LA is embodied in longitudinal extension of the handle 2 of the spoon 1. The longitudinal axis LA preferably corresponds substantially to the midline axis of the spoon 1 embodied in longitudinal extension.

By preference, the part of the retaining edge 5 arranged on the first side S1 of the spoon 1 and the part of the retaining edge 5 arranged on the second side S2 of the spoon 1 is foldable separately or respectively separated from one another relative to the base region 3. That is, for example, while the part of the retaining edge 5 arranged on the first side S1 of the spoon is folded inwards relative to the base region 3 because of an external force acting on this part of the retaining edge 5, the part of the retaining edge 5 arranged on the second side S2 of the spoon 1, on which no external force acts, remains in the position of the resting condition. The same is true in the contrary case, that is, external force on the second side S2 and no external force on the first side S1.

If an external force caused, for example, by the user's lips or respectively mouth acts both on the part of the retaining edge 5 arranged on the first side S1 of the spoon 1 and also on the part of the retaining edge 5 arranged on the second side S2 of the spoon 1, that is, on the entire retaining edge 5, both parts of the retaining edge 5, that is the entire retaining edge 5, is folded inwards relative to the base region 3.

Figure 3:
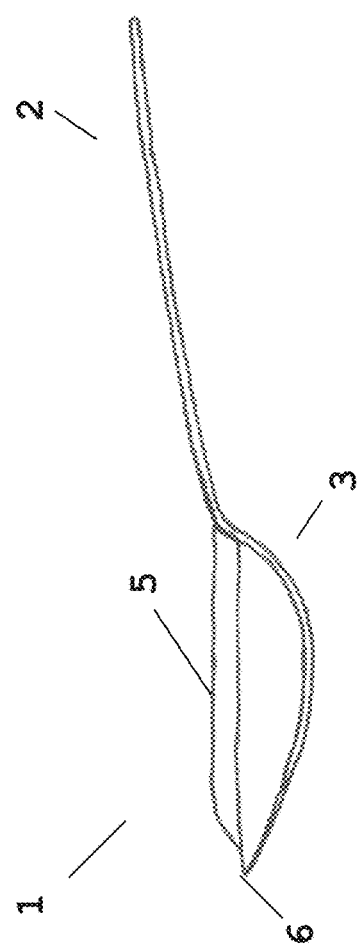
FIG. 3 shows a schematic lateral view of a spoon according to the invention from FIGS. 1 and 2.

FIG. 3 visualises a schematic lateral view of a spoon 1 with a handle 2 and a rigid central base region 3, which merges at its periphery into an extended portion, which, in the resting condition, forms a retaining edge 5 inclined inwards relative to the vertical axis 4. The retaining edge 5 is foldable relative to the rigid central base region.

FIGS. 4-7 show cross sections from FIG. 2 from A-A.

FIG. 4 shows a schematic cross-section of a rigid central base region 3 with retaining edge 5 in the resting condition, which is inclined inwards relative to the vertical axis 4 at angle α. The retaining edge 5 is foldable with reference to the rigid central base region. FIG. 4 shows that, in the unloaded resting condition, a hollow space or respectively cavity is preferably formed between the base region 3 and the retaining edge 5.

Figure 5:
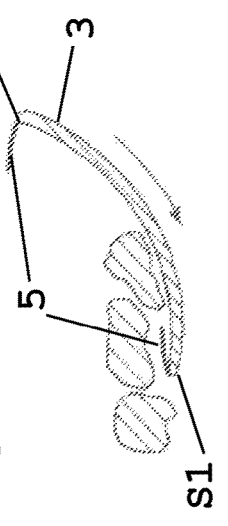

FIG. 5 shows the food consumption with the spoon according to the invention, for example, from a plate or bowl. The retaining edge 5 yields to the pressure of the food in the case of a relative movement of the food towards the centre of the bowl and fold inwards. Accordingly, the food reaches the rigid central base region 3. In this context, (in the folded condition), the retaining edge 5 is disposed with its full surface on the base region 3 or respectively the retaining edge 5 is disposed in full-surface contact with the base region 3.

According to FIG. 5, preferably, only the part of the retaining edge 5 which is arranged on a first side S1 of the spoon from which the food is consumed folds inwards relative to the base region 3. The part of the retaining edge 5 which is arranged on the second side S2 of the spoon disposed opposite of the first side S1 used for the consumption of the food, is preferably not folded inwards relative to the base region 3, that is, remains in the position of the resting condition, in order to prevent a lateral dropping or respectively spilling of the food consumed via the second side S2 of the spoon.

Figure 6:
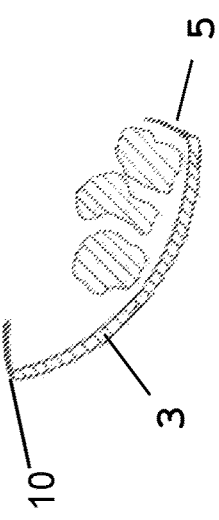

FIG. 6 shows the method of operation of the retaining edge 5 during the movement of the spoon with food. If the rigid central base region 3 with the food is moved out of the horizontal, through its intrinsic tension, the retaining edge 5 prevents the spilling or respectively slipping of the food in the case of a relative movement of the food towards the edges of the rigid central base region 3.

Figure 7:
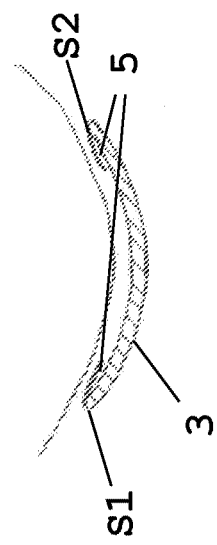
Figure 8:
FIG. 8 shows schematically a cross-section of a conventional spoon without extended portion which forms an inwardly inclined retaining edge in the resting condition.

FIG. 7 shows the removal of the food with the mouth or respectively the upper lip. The retaining edge 5 yields to the pressure of the lips and folds inwards in the direction towards the centre of the rigid central base region 3. In this context, (in the folded condition), the retaining edge 5 is preferably disposed with its full surface on the base region 3 or respectively the retaining edge 5 is in full-surface contact with the base region 3.

As shown in FIG. 7, the external force caused by the mouth or respectively lip acts both on the part of the retaining edge 5 arranged on the first side S1 and also on the part of the retaining edge 5 arranged on the second side S2, that is, on the entire retaining edge 5, so that both parts of the retaining edge 5, that is, the entire retaining edge 5, are folded inwards relative to the base region 3. Accordingly, the food can be removed.

LIST OF REFERENCE NUMBERS

1 Spoon
2 Handle
3 Rigid central base region
4 Vertical axis
5 Retaining edge
6 Opening of the retaining edge
LA Longitudinal axis of the spoon
S1 First side of the spoon
S2 Second side of the spoon

The invention claimed is:

1. A spoon (1) with a handle (2) and a rigid central base region (3), wherein the rigid central base region (3) merges at its periphery into an extended portion, which, in a resting condition, forms a retaining edge (5) inclined inwards relative to the vertical axis (4), wherein the retaining edge is embodied to be foldable inwards relative to the rigid central base region (3) through a hinge wherein said hinge has an arcuate shape, and wherein the retaining edge is embodied to be foldable inwards relative to the base region when acted on an external force in such a manner that, in the folded condition, the retaining edge is disposed in full-surface contact with the rigid base region and automatically returns to the resting condition when the external force is removed, wherein the central base region (3) has a concave configuration and wherein the retaining edge (5) has an opening (6) at a tip of the central base region (3) and extends around the central base region (3) and connects to the base region (3) at the arcuate hinge.

2. The spoon according to claim 1, wherein in the resting condition, the retaining edge (5) is arranged relative to the vertical axis (4) at an angle α of 0-90°.

3. The spoon according to claim 2, wherein the angle α is between 10° and 80°.

4. The spoon according to claim 3, wherein the angle α is between 30° and 60°.

5. The spoon according to claim 1, wherein the retaining edge (5) comprises the same material as the rigid central base region (3).

6. The spoon according to claim 1, wherein the rigid central base region (3) and the retaining edge (5) comprise a synthetic material.

7. The spoon according to claim 1, wherein the retaining edge (5) comprises a different material from the rigid central base region (3).

* * * * *